Figure 1:
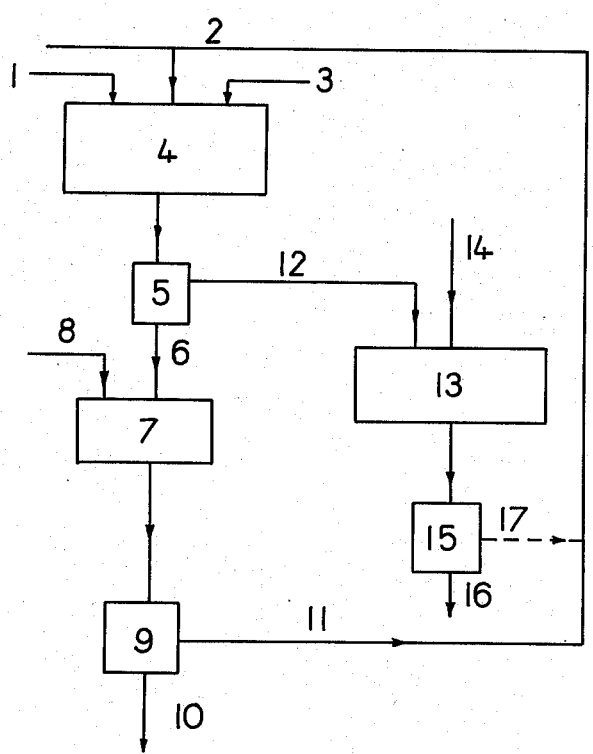

Nov. 11, 1952   J. KIELLAND ET AL   2,617,710
METHOD OF EXTRACTING POTASSIUM FROM DILUTE SOLUTIONS
Filed July 1, 1949   3 Sheets-Sheet 1

Inventors:
J. Kielland
& H. Harang
By E. F. Wenderoth
Atty

Patented Nov. 11, 1952

2,617,710

UNITED STATES PATENT OFFICE 2,617,710

METHOD OF EXTRACTING POTASSIUM FROM DILUTE SOLUTIONS

Jacob Kielland and Håkon Harang, Herøya, near Porsgrunn, Norway, assignors, by mesne assignments, to A/S Norduco, Oslo, Norway, a joint-stock company of Norway Application July 1, 1949, Serial No. 102,632
In Norway July 5, 1948

10 Claims. (Cl. 23—25)

It is known that potassium can be extracted from solutions containing only small quantities of potassium salts, e. g. seawater, by adding to the dilute potassium solution a solution of an easily soluble salt, e. g. calcium salt, of a highly nitrated secondary aromatic amine, e. g. hexa-nitrodiphenyl-amine or dipicryl amine, precipitating thereby the practically insoluble potassium aminate salt and separating it by filtration. It is further known that said precipitated potassium aminate can be split with an acid, attaining on one hand the insoluble free amine, which is filtered off, converted to an easily soluble salt by means of a suitable base, e. g. lime, and as an aminate solution returned to the process for renewed precipitation of potassium, and attaining on the other hand a comparatively concentrated solution of the potassium salt of the employed acid.

Aromatic amino and nitro compounds, including highly nitrated secondary aromatic amines, have the tendency to cause skin eczema and possess also other toxic properties. Thus, if handled for long periods, even small quantities of said compounds may lead to severe cases of poisoning amongst the workers. In fact, these unfortunate properties are so pronounced that hitherto no industrial utilization has been made of the method described in the introduction.

We have observed that the various forms in which such highly nitrated secondary aromatic amines can appear are not all equally dangerous, the toxic effect to the human body being to a very high degree dependent on the solubility of the amine compounds and on the concentration of the amines in solution.

The present invention applies to a method of extracting potassium from dilute solutions, e. g. from seawater or water from natural lakes and springs, by means of a highly nitrated secondary aromatic amine, the poisoning risk for the workers being thereby effectively reduced in comparison to the known methods.

According to the invention this important improvement is achieved by working mainly in acidic liquids where the toxic amines are almost completely insoluble and also by using at the same time very low aminate concentration in those processing steps where the working in acid media is not possible. The method also means improved conditions of growth for the potassium aminate crystals, producing larger and more even crystals, the supersaturation being kept low and uniform in the crystallization zone. As a step in the effort to increase the size of the crystals, a part of the crystal suspension might constantly be fed back to the precipitation vessel.

In the known method, described in the introduction, the very large filter areas cause a special hazard with respect to the poisoning risk owing to the inevitable running and maintenance work. It therefore means an improvement of importance when, in connection with the present invention as compared to the previously accepted method, we have been able to reduce the filter areas to about a seventh by using thickeners and sand filters, which require less supervision and maintenance, and which, in addition, are cheaper.

With reference to the outlined flow sheets we shall in the following paragraphs further describe the steps of production in accordance with the procedure of the present invention, it being understood that the invention is not therefore limited to the example shown.

Figure 2:
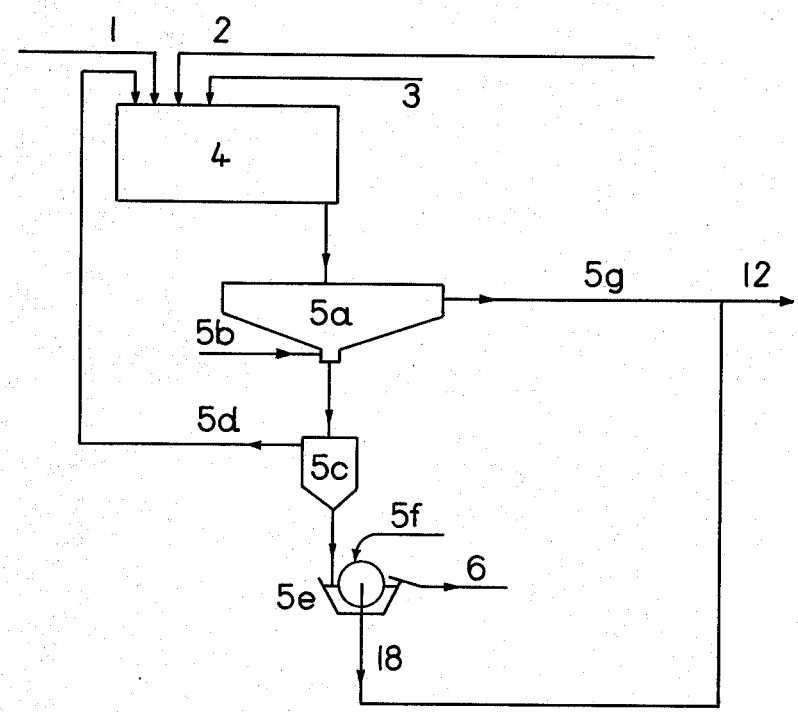
Figure 3:
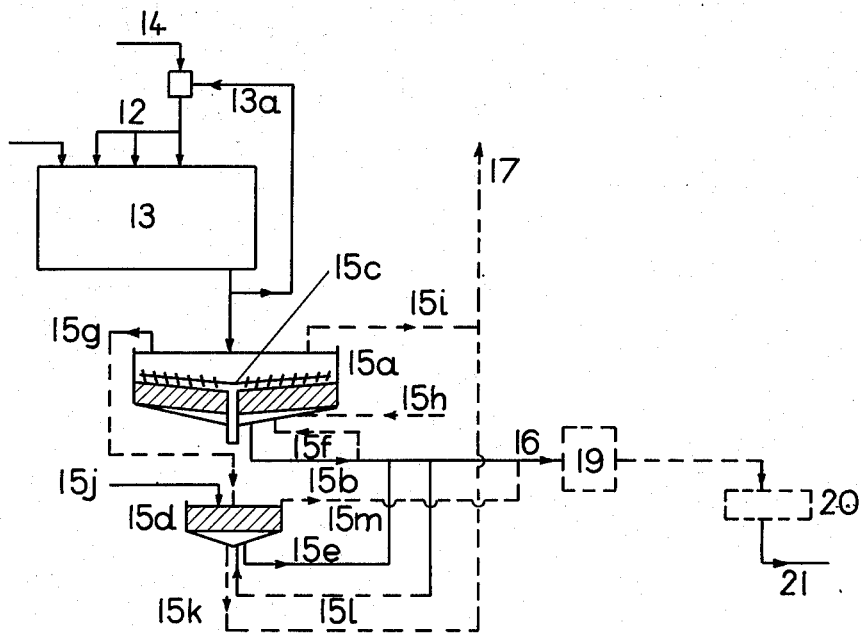

The main flow sheet, Fig. 1, illustrates the procedure in its rough principal features, while Figs. 2 and 3 more closely illustrate modes of operation for the important points in the procedure which are included in the main flow sheet under position numbers 5 and 15.

The precipitation of insoluble potassium aminate takes place in the precipitation vessel 4, where the dilute potassium salt solution, e. g. seawater, is continually supplied through 1 at the same time as the precipitating agent is supplied through 2 in the form of a suspended highly nitrated secondary aromatic free amine.

Milk of lime or another suitable base, i. e. a base which transforms the suspended free amine into water soluble aminate, is added through 3. The precipitation vessel 4 (the precipitation might of course as well be divided among a number of vessels) may for instance be given such shape and dimensions that the stream of liquid and solid material will flow as a quiet stream through the vessel in a direction toward the outlet, the base from 3 being introduced stepwise through a number of inlets following in sequence after the introduction spots for the dilute potassium containing solution and the solid amine. We have found it recommendable to establish and maintain a pH value between 7 and 10 throughout the precipitation zone. The stepwise introduction of the base has the effect that the suspended amine crystals are dissolved successively, that the degree of aminate supersaturation is kept down, whereby the formation of new aminate nuclei is restricted and conditions of crystal growth improved. The size of the crystals increases further when arranging a re-introduction (5d) of potassium aminate crystals from the separating plant 5.

The stream from the precipitation vessel 4 is conveyed to a separating plant 5 (for details see Fig. 2 and the position list) and divided into the following four fractions.

*Fraction a.*—Clear overflow 5g to 12 from thickener 5a. This fraction, which amounts to about 98% in volume of the contents from 4, contains some dissolved precipitating agent, which is precipitated as free amine by the addition of acid in the vessel 13 in the known way. The discharge from 13 is then filtered through the sand filters 15a and 15d and the recovered amine 17 is intermittently returned to the process in the potassium precipitation vessel 4, while the filtrate 16 goes to the sewer, possibly via active charcoal filter 19 for further removal of poisonous amine residues and after de-acidification 20 with, for example $CaCO_3$ precipitated out earlier in the process.

After fraction a is eliminated, a minor quantity of acid 5b, sufficient to reduce pH to about 3, is added in or near the outlet of the thickener 5a, whereby the precipitating agent dissolved in the remainder of the lye is precipitated out as fine amine crystals, which are taken out together with fraction b.

*Fraction b.*—A suspension 5d of comparatively fine potassium aminate crystals which amount to for example, about 50% in weight of the total potassium salt is, together with the fine amine crystals mentioned above, returned to the precipitation vessel 4.

*Fraction c.*—Comparatively coarse grained potassium aminate 6 is conducted, after washing on filter 5e, to the vessel 7 for treatment with acid 8 in the known way, whereby the acid's potassium salt is obtained in dissolved form and the amine freed. From the filter 9 the liberated amine is conducted to a buffer tank (not on the drawing) where the amine crystals are suspended in some of the original potassium solution, e. g. seawater, and conveyed back 11 to the precipitation vessel 4 in the form of a suspension 2.

*Fraction d.*—The filtrate from filter 9 which contains the extracted potassium in the form of an easily soluble salt, is conveyed further for working up in the usual way 10.

If the method is to be used for the extraction of potassium from sea water, about 50% of the total acid consumption can be saved, namely the quantity which is involved in splitting the seawater's bicarbonate content, by neutralizing the bicarbonate with milk of lime in the presence of $CaCO_3$-sludge as precipitating nuclei and then filtering on sand filters. The cleaning of the sand filters may in any case be easily combined with the de-acidification of the treated sea water before it is sent to the sewer.

Otherwise we refer to the attached flow sheet and the appurtenant position list, whereof the latter is set up with particular consideration for the method's adjustment for processing sea water.

1—Sea water, alternatively sea water after pretreatment and filtering.
2—Precipitating agent (i. e. free amine), suspended in, e. g. sea water.
3—Base, e. g., milk of lime.
4—Precipitating vessel for reaction of precipitating agent and base with sea water's potassium content.
5—Separation of precipitated potassium salt 6 and sea water residue 12.
5a—Dorr thickener. The overflow 5g amounts to about 98% in volume of the quantity supplied to the Dorr thickener.
5b—Acid addition to pH=3.
5c—Hydro separator.
5d—Conveying back of about 50% of the potassium aminate salt as a suspension of the relatively smallest crystals.
5e—Rotary vacuum filter.
5f—Wash water.
5g—Lye overflow from Dorr thickener to 12.
6—Separated potassium salt.
7—Reaction vessel for reaction of potassium salt with acid.
8—Addition of acid (e. g. nitric acid).
9—Separation of recovered precipitating agent and potassium solution.
10—Potassium solution for working up in the usual way.
11—Recovered precipitating agent.
12—Sea water residue 5g+18, freed of the main part of the precipitated potassium salt, however containing some dissolved precipitating agent.
13—Precipitation vessel for recovery of remaining precipitating agent from 12 by addition of acid in the usual way.
13a—Circulating acid sea water residue for the mixing in of the necessary acid.
14—Acid addition.
15—Separation of precipitated recovered precipitating agent, and sea water residue.
15a—Sand filter for separation of precipitated free amine, potassium aminate fines and sludge residue from the remaining acidic sea water.
15b—Carrying away of acid filtrate.
15c—Mechanical scraping of the bulk of separated sludge with transfer to smaller sand filter.
15d—Smaller sand filter.
15e—Acid filtrate to be carried away together with 15b.
15f—Occasional backflush of sand filter 15a with filtrate 15b or 15e to expel sludge lodged in the sand.
15g—Suspension from backflush to be switched over to 15d.
15h—Sea water backflush for complete dissolving of remaining precipitating agent, to be returned over 15i and 17.
15i—See under 15h.
15j—Occasional introduction of lime water and/or sea water for dissolving and recovering of precipitating agent particles collected on sand filter to be returned over 15k and 17.
15k—See under 15j.
15l—Washing of lime sludge residue from sand filter 15d by backflush.
15m—Carrying away of lime sludge from 15d to 16.
16—Filtrate 15b + filtrate 15e, occasionally also 15m.
17—Recovered precipitating agent, suspended and/or dissolved.
18—Filtrate from 5e taken together with 5g to 12 for recovery of precipitating agent.
19—Active coal filter.
20—Treatment with $CaCO_3$ (e. g. from precleaning ingoing sea water) for de-acidification.
21—To sewage.

We claim:
1. A method of extracting potassium from an aqueous solution of a potassium compound, com- prising the steps of adding to the said solution a highly nitrated diphenyl amine in solid state, and lime which forms an easily soluble salt with the highly nitrated diphenyl amine, precipitating thereby a substantially insoluble potassium salt of said amine, separating the said substantially insoluble potassium salt and treating it with a mineral acid, recovering thereby the free highly nitrated diphenyl amine in solid state, separating the latter and conveying it back to the potassium precipitation step for reuse as a potassium precipitating agent, and obtaining simultaneously a potassium salt solution of the said acid.

2. A method of extracting potassium from an aqueous solution of a potassium compound, comprising the steps of adding to the said solution hexanitrodiphenyl-amine (dipicryl amine) and lime which forms an easily soluble salt with the hexanitrodiphenyl-amine, precipitating thereby a substantially insoluble potassium salt of said amine, separating the said substantially insoluble salt and treating it with a mineral acid, recovering thereby the free hexanitrodiphenyl-amine in solid state, separating the latter and conveying it back to the potassium precipitation step for re-use as a potassium precipitating agent and obtaining simultaneously a potassium salt solution of the said acid.

3. A method of extracting potassium from an aqueous solution of a potassium compound, comprising the steps of adding to the said solution a highly nitrated diphenyl amine in solid state and lime which forms an easily soluble salt with the highly nitrated diphenyl amine, precipitating thereby a substantially insoluble potassium salt of said amine, separating said precipitated salt, returning a minor part of the latter to the potassium precipitation step, treating the major part of the said precipitated salt with a mineral acid, recovering thereby the free highly nitrated diphenyl amine in solid state, separating the latter and conveying it back to the potassium precipitation step for re-use as a potassium precipitating agent, and obtaining simultaneously a potassium salt solution of the said acid.

4. A method of extracting potassium from an aqueous solution of a potassium compound, comprising the steps of adding to the said solution hexanitrodiphenyl-amine (dipicryl amine) and lime which forms an easily soluble salt with the hexanitrodiphenyl-amine, precipitating thereby a substantially insoluble potassium salt of said amine, separating said precipitated salt, returning a minor part of the latter to the potassium precipitation step, treating the major part of the said precipitated salt with a mineral acid, recovering thereby the free hexanitrodiphenyl amine in solid state, separating the latter and conveying it back to the potassium precipitation step for re-use as a potassium precipitating agent, and obtaining simultaneously a potassium salt solution of the said acid.

5. A method of extracting potassium from an aqueous solution of a potassium compound, comprising the steps of adding to the said solution a highly nitrated diphenyl amine in solid state and lime which forms an easily soluble salt with the highly nitrated secondary aromatic amine, precipitating thereby a substantially insoluble potassium salt of said amine, treating the mixture from the potassium precipitation step in a thickening plant, acidifying with mineral acid the thus-thickened portion, which contains the main part of the precipitated potassium compound, to a pH of about 3, precipitating thereby surplus free amine as fine crystals, subjecting the acidified thickened portion to a separating process from which the fine amine crystals together with the smaller potassium aminate crystals are conveyed back to the potassium aminate precipitation step in the form of a suspension, treating the coarser potassium aminate crystals from the separating step with more acid, recovering thereby the free highly nitrated diphenyl amine in solid state, separating the latter and conveying it back to the potassium precipitation step for re-use as a potassium precipitating agent, and obtaining simultaneously a potassium salt solution of the said acid.

6. A method of extracting potassium from an aqueous solution of a potassium compound, comprising the steps of adding to the said solution hexanitrodiphenyl-amine (dipicryl amine) and lime which forms an easily soluble salt with the hexanitrodiphenyl-amine, precipitating thereby a substantially insoluble potassium salt of said amine, treating the mixture from the potassium precipitation step in a thickening plant, acidifying with mineral acid the thus-thickened portion, which contains the main part of the precipitated potassium compound to a pH of about 3, precipitating thereby surplus free hexanitrodiphenyl-amine as fine crystals, subjecting the acidified thickened portion to a separating process from which the fine amine crystals together with the smaller potassium aminate crystals are conveyed back to the potassium aminate precipitation step in the form of a suspension, treating the coarser potassium aminate crystals from the separating step with more acid, recovering thereby the free hexanitrodiphenyl-amine in solid state, separating the latter and conveying it back to the potassium precipitation step for re-use as a potassium precipitating agent, and obtaining simultaneously a potassium salt solution of the said acid.

7. A method of extracting potassium from an aqueous solution of a potassium compound, comprising the steps of adding to the said solution a high nitrated diphenyl amine in solid state and lime which forms an easily soluble salt with the highly nitrated diphenyl amine, precipitating thereby a substantially insoluble potassium salt of said amine, separating and treating the precipitate with a mineral acid, recovering thereby the free highly nitrated diphenyl amine in solid state, separating the latter and conveying it back to the potassium precipitation step for re-use as a potassium precipitating agent, and obtaining simultaneously a potassium salt solution, and acidifying with mineral acid the solution which remains after having separated off the precipitated potassium aminate, precipitating thereby surplus precipitating agent as fine crystals of free amine, separating off the free amine and returning it for re-use in the potassium precipitation step.

8. A method of extracting potassium from an aqueous solution of a potassium compound, comprising the steps of adding to the said solution hexanitrodiphenyl-amine (dipicryl amine) in solid state and lime which is able to form an easily soluble salt with the hexanitrodiphenyl-amine, precipitating thereby a substantially insoluble potassium salt of said amine, separating and treating the precipitate with a mineral acid, recovering thereby the free hexanitrodiphenyl-amine in solid state, separating the latter and conveying it back to the potassium precipitation step for re-use as a potassium precipitating agent, and obtaining simultaneously a potassium salt solution, and acidifying with mineral acid the solution which remains after having separated off the precipitated potassium aminate, precipitating thereby surplus precipitating agent as fine crystals of free amine, separating off the free amine and returning it for re-use in the potassium precipitation step.

9. A method of extracting potassium from an aqueous solution of a potassium compound, which comprises precipitating the potassium with a highly nitrated diphenyl amine, whereby a substantially insoluble salt of potassium and the said amine is formed, and recovering the main portion of the precipitating agent for use again in the process, with the aid of the following steps: (a) precipitating the potassium in the solution with a suspension of highly nitrated diphenyl amine in the presence of lime which forms and easily soluble salt with said amine, precipitating thereby a substantially insoluble potassium salt of said amine; (b) conveying the reaction mixture from (a) to a thickening plant, from which almost clear solution goes off through an overflow, while a small quantity of mineral acid is added to the thickened portion, which is thereupon separated into two fractions, one of which, containing fine crystals, is returned to the potassium aminate precipitation step, while the larger potassium aminate crystals, contained in the second fraction, are separated and treated with more mineral acid, recovering thereby the free highly nitrated diphenyl amine in solid state, separating the latter and conveying it back to the potassium aminate precipitation step for re-use as a potassium precipitating agent, and obtaining simultaneously a potassium salt solution of said acid; (c) adding mineral acid to the overflow solution from the thickening plant, which contains some dissolved aminate, precipitating thereby free amine and separating it, and returning it to the process.

10. A method of extracting potassium from an aqueous solution selected from the group consisting of seawater, water from salt lakes and water from saline springs, comprising the steps of adding to the said solution hexanitrodiphenyl-amine (dipicryl amine) and lime, which forms an easily soluble salt with the hexanitrodiphenyl-amine, precipitating thereby a substantially insoluble potassium salt of said amine, separating the said substantially insoluble salt and treating it with a mineral acid, recovering thereby the free hexanitrodiphenyl-amine in solid state, separating the latter and conveying it back to the potassium precipitation step for re-use as a potassium precipitating agent and obtaining simultaneously a potassium salt solution of the said acid.

JACOB KIELLAND.
HÅKON HARANG.

REFERENCES CITED

The following references are of record in the file of this patent:

UNITED STATES PATENTS

| Number | Name | Date |
|---|---|---|
| 2,258,381 | Fleischer et al. | Oct. 7, 1941 |

OTHER REFERENCES

Steel: "Water Supply and Sewerage," 2nd ed., page 323; N. Y., McGraw-Hill Co., 1947.

Booth: "Water Softening and Treatment," page 19. London, Archibald Constable and Co., Ltd., 1906.